United States Patent
Claywell et al.

(10) Patent No.: US 12,503,966 B2
(45) Date of Patent: Dec. 23, 2025

(54) SHAPED CORE FOR MAIN BEARING OIL FEED GROOVE

(71) Applicant: GM GLOBAL TECHNOLOGY OPERATIONS LLC, Detroit, MI (US)

(72) Inventors: Mark Claywell, Birmingham, MI (US); Bryan K. Pryor, Clarkston, MI (US); Brian D. Kaminski, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/517,684

(22) Filed: Nov. 22, 2023

(65) Prior Publication Data

US 2025/0163833 A1    May 22, 2025

(51) Int. Cl.
*F01M 11/02* (2006.01)
*F02F 7/00* (2006.01)

(52) U.S. Cl.
CPC ............ *F01M 11/02* (2013.01); *F02F 7/0095* (2013.01); *F01M 2011/026* (2013.01)

(58) Field of Classification Search
CPC ............ F01M 11/02; F01M 2011/026; F01M 2011/027; F01M 2011/028; F02F 7/0095; B22C 70/06
See application file for complete search history.

(56) References Cited

U.S. PATENT DOCUMENTS

| | | | |
|---|---|---|---|
| 7,201,118 B2* | 4/2007 | Lenz | F01P 3/08 123/196 R |
| 2005/0047689 A1* | 3/2005 | Yamazaki | F16C 33/105 384/288 |
| 2014/0126847 A1* | 5/2014 | Beaurepaire | F16C 17/022 384/397 |
| 2016/0153396 A1 | 6/2016 | Jang | |
| 2020/0291834 A1* | 9/2020 | Koyama | F01L 1/047 |

FOREIGN PATENT DOCUMENTS

| | | | | |
|---|---|---|---|---|
| DE | 102012222353 A1 * | 6/2013 | | F01M 1/06 |
| JP | 2004019513 A * | 1/2004 | | |
| WO | 2014085430 A2 | 6/2014 | | |
| WO | WO-2018148769 A1 * | 8/2018 | | F02F 7/00 |

OTHER PUBLICATIONS

Brand, M.: Geometriesprunge vermeiden. In: Brand, M.: Physik begreifen-besser konstruieren. Berlin, Heidelberg: Springer Berlin Heidelberg, 2020. S. 77-84.—ISBN 9783662608234.

* cited by examiner

*Primary Examiner* — Syed O Hasan
(74) *Attorney, Agent, or Firm* — Ingrassia Fisher & Lorenz, LLP | IF&L (57) ABSTRACT

A number of variations disclosed may include a product which may include a casting having a surface defining a main bearing feed groove and a surface defining at least one oil feed groove, the surface defining the main bearing feed groove and surface defining the at least one oil feed groove intersecting without any sharp corners or edges so that a smooth flow path is defined through the main bearing feed groove and into the at least one oil feed groove.

19 Claims, 10 Drawing Sheets

SHAPED CORE FOR MAIN BEARING OIL FEED GROOVE

INTRODUCTION

The technical field generally relates to a combustion engine block having a main bearing oil feed groove, a casting core shaped to produce the same, and methods of making the same.

BACKGROUND

Prior engine block configurations for supplying oil to a crankshaft bearing can produce undesirable high oil pressure drop.

Accordingly, it may be desirable to provide an engine block configuration that improves oil feed to a crankshaft bearing at desired oil pressure.

SUMMARY

A number of variations may include a product that may include a casting having a surface defining a main bearing feed groove and a surface defining at least one oil feed groove, the surface defining the main bearing feed groove and surface defining the at least one oil feed groove intersecting without any sharp corners or edges so that a smooth flow path is defined through the main bearing feed groove and into the at least one oil feed groove.

A number of variations may include a method including placing a casting core in a casting mold and pouring molten metal into the casting mold; allowing the molten metal to cool to form a solidified metal and form at least a portion of a casting; removing the casting core to leave a cavity in the solidified metal configured to receive a cylindrical bearing; forming a main bearing feed groove in the solidified metal communicating with the cavity in the solidified metal, wherein the main bearing feed groove is defined by a main bearing feed groove surface and the cavity in the solidified metal is defined in part by at least in oil feed groove surface, and wherein the main bearing feed groove surface and the at least one oil feed groove surface define an oil flow path free of sharp corners or edges.

A number of variations may include a casting core having an inverse mouth portion including a flat surface having a first end and an opposite second end, a first curved surface connected to a first end of the flat surface so that the first curved surface and the first end of the flat surface form a first corner, and a second curved surface connected to the second end of the flat surface so that the second curved surface and the second end of the flat surface form a second corner, and wherein the first curved surface curves away from a first imaginary line extending perpendicular to the flat surface and intersecting the first corner, and wherein the second curved surface curves away from a second imaginary line extending perpendicular to the flat surface and intersecting the second corner.

BRIEF DESCRIPTION OF THE DRAWINGS

The variations will hereinafter be described in conjunction with the following drawing figures, wherein like numerals denote like elements, and wherein.

DETAILED DESCRIPTION

The following detailed description is merely illustrative in nature and is not intended to limit the application and uses. Furthermore, there is no intention to be bound by any expressed or implied theory presented in the preceding technical field, background, summary, or the following detailed description.

Figure 1:
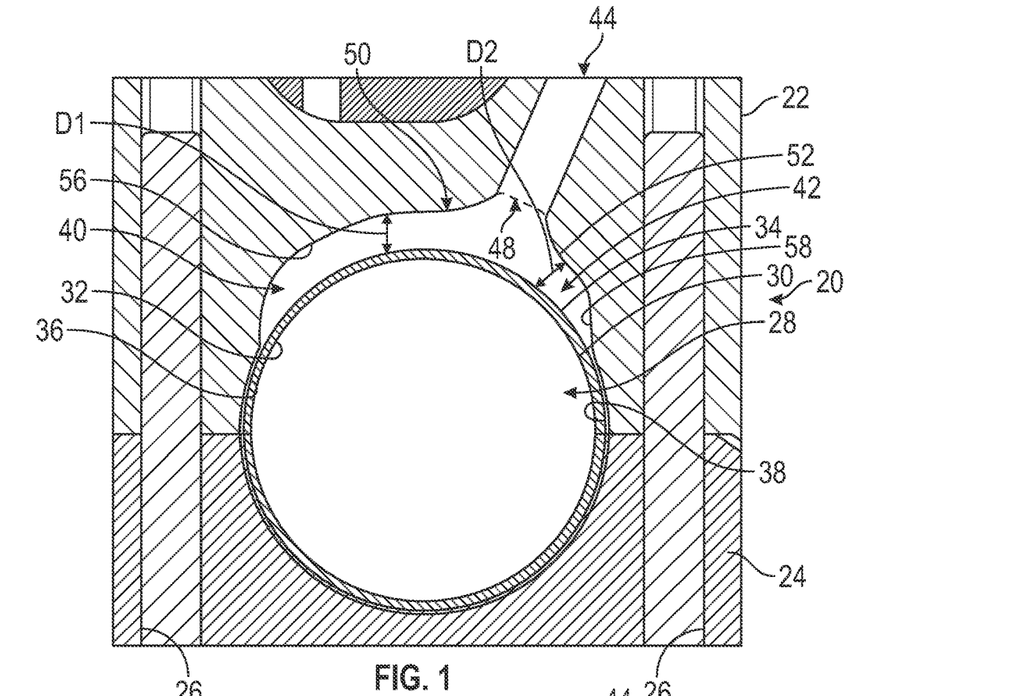
FIG. 1 is a sectional view of a combustion engine block connected to a crankshaft case, a crankshaft bearing received in cavities defined by the combustion engine block and crankshaft case, wherein the combustion engine block includes a first surface defining at least a first oil feed groove communicating and a second surface defining a main bearing feed groove to provide an oil passage without sharp edges according to a number of variations.
Figure 2:
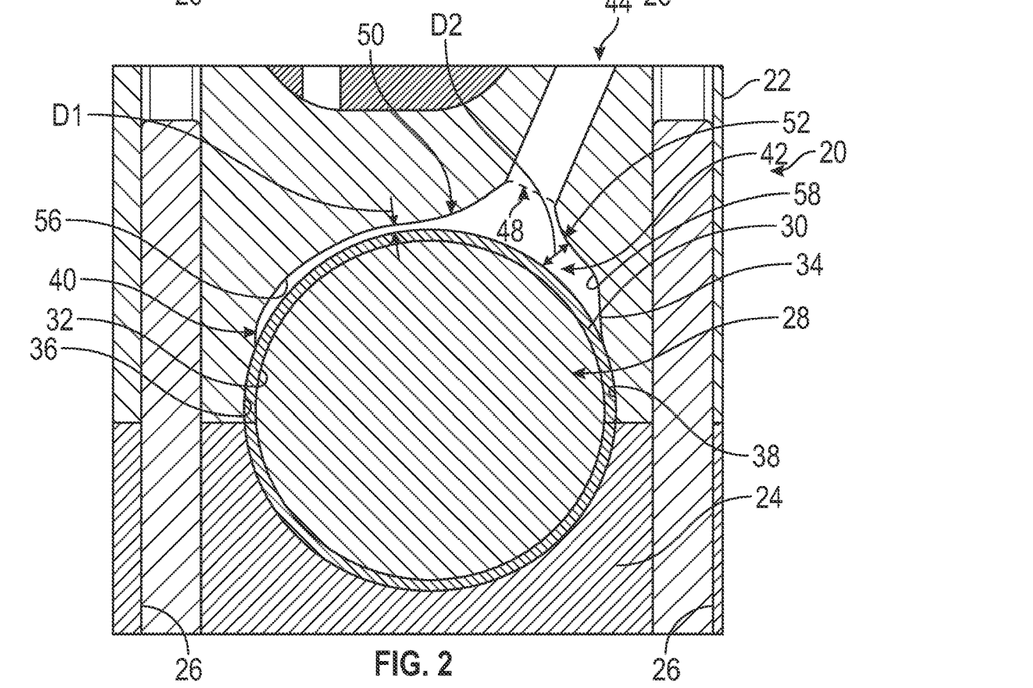
FIG. 2 is a sectional view of a combustion engine block connected to the crankshaft case, a crankshaft bearing received in cavities defined by the combustion engine block and crankshaft case, wherein the combustion engine block includes a first surface defining at least a first oil feed groove and a second surface defining a main bearing feed groove to provide an oil passage without sharp corners or edges according to a number of variations.

FIGS. 1-2 illustrate a number of variations, which may include a product 20, which may include casting, which may be a combustion engine block 22. The product may also include a crankshaft case 24, and threaded bolt holes 26 may extend through that crankshaft case 24 and combustion engine block 22, and a threaded bolt (not shown) thread into at least one of the threaded bolt holes 26 to bolt together the combustion engine block 22 and crankshaft case 24. The combustion engine block 22 may have a first cavity 28 formed therein. The crankshaft case 24 may have a second cavity 29 formed therein. The first cavity 28 formed in the combustion engine block 22 and the second cavity 29 formed in the crankshaft case 24 are formed to receive a crankshaft cylindrical bearing 30 therein. An inner cylindrical surface 32 of a bearing, which may be a crankshaft cylindrical bearing 30 forms an opening 33 for receiving a crankshaft 201. n outer cylindrical surface 34 of the crankshaft cylindrical bearing 30 may engage a first arc shaped surface 36 and a second arc shaped surface 38 of the combustion engine block 22. The first cavity 28 formed in the combustion engine block 22 may include a first oil charge portion or groove 40 and a second oil charge portion or groove 42. In a number of variations, each of the first oil charge portion or groove 40 and a second oil charge portion or groove 42 may have an arch shaped portion. A surface 45 may define a main bearing feed groove 44, which may be formed on the combustion engine block 22 and may communicate with a mouth portion 48 located between the first oil charge portion or groove 40 and a second oil charge portion or groove 42. A first convex shaped surface 50 of the combustion engine block 22 may be connected to the surface 45, defining the main bearing feed groove 44. A second convex shaped surface 52 of the combustion engine block 22 may be connected to the surface 45 defining the main bearing feed groove 44. The surface 45 defining the main bearing feed groove 44, the first convex shaped surface 50 and the second convex shaped surface 52 defined in oil passage free of any sharp surfaces, such as shape corners or edges, that would create undesired turbulence or high-pressure in oil flowing through the same to feed the crankshaft cylindrical bearing 30. The combustion engine block 22 may have a first concave surface 56 partially defining the first oil charge portion or groove 40. The combustion engine block 22 may have a second concave surface 58 partially defining the second oil charge portion or groove 42.

In a number of variations, for example as illustrated in FIG. 1, the first convex shaped surface 50 and the second convex shaped surface 52 may be similarly configured or substantially the same. In a number of variations, for example as illustrated in FIG. 1, the first convex shaped surface 50 and the second convex shaped surface 52 may be symmetrical. In a number of variations, for example, as illustrated in FIG. 1, a first distance D1 between the outer surface 34 of the crankshaft cylindrical bearing 30 and the first concave shaped surface 56 of the combustion engine block 22 may be the same or substantially the same as a second distance D2 between the outer surface 34 of the crankshaft cylindrical bearing 30 and the second concave shaped surface 58 of the combustion engine block 22.

In a number of variations, for example as illustrated in FIG. 2, the first convex shaped surface 50 and the second convex shaped surface 52 may not be similarly configured the same or substantially the same. In a number of variations, for example as illustrated in FIG. 2, the first convex shaped surface 50 and the second convex shaped surface 52 may be asymmetrical. In a number of variations, for example, as illustrated in FIG. 2, a first distance D1 between the outer surface 34 of the crankshaft cylindrical bearing 30 and the first concave shaped surface 56 of the combustion engine block 22 may not be the same or substantially the same as a second distance D2 between the outer surface 34 of the crankshaft cylindrical bearing 30 and the second concave shaped surface 58 of the combustion engine block 22.

Figure 3:
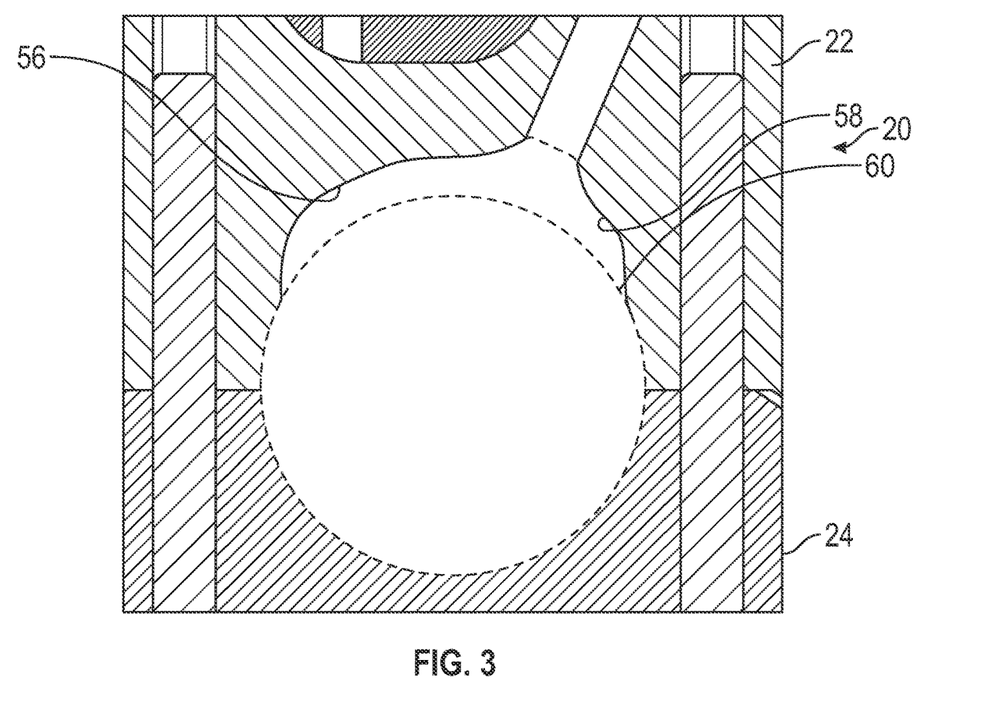
FIG. 3 is a sectional view of the combustion engine block, crankshaft case of FIG. 1 with the crankshaft bearing removed.

FIG. 3 is a sectional view of the combustion engine block, crankshaft case of FIG. 1, with the crankshaft bearing removed. An imaginary circle 61 is shown engaging or aligning with the first arc shaped surface 36 and the second arc shaped surface 38 of the combustion engine block 22. In a number of variations, a first distance D1 between the outer surface 34 of the crankshaft cylindrical bearing 30 and the first concave shaped surface 56 of the combustion engine block 22 may be the same or substantially the same as a second distance D2 between the outer surface 34 of the crankshaft cylindrical bearing 30 and the second concave shaped surface 58 of the combustion engine block 22.

Figure 4:
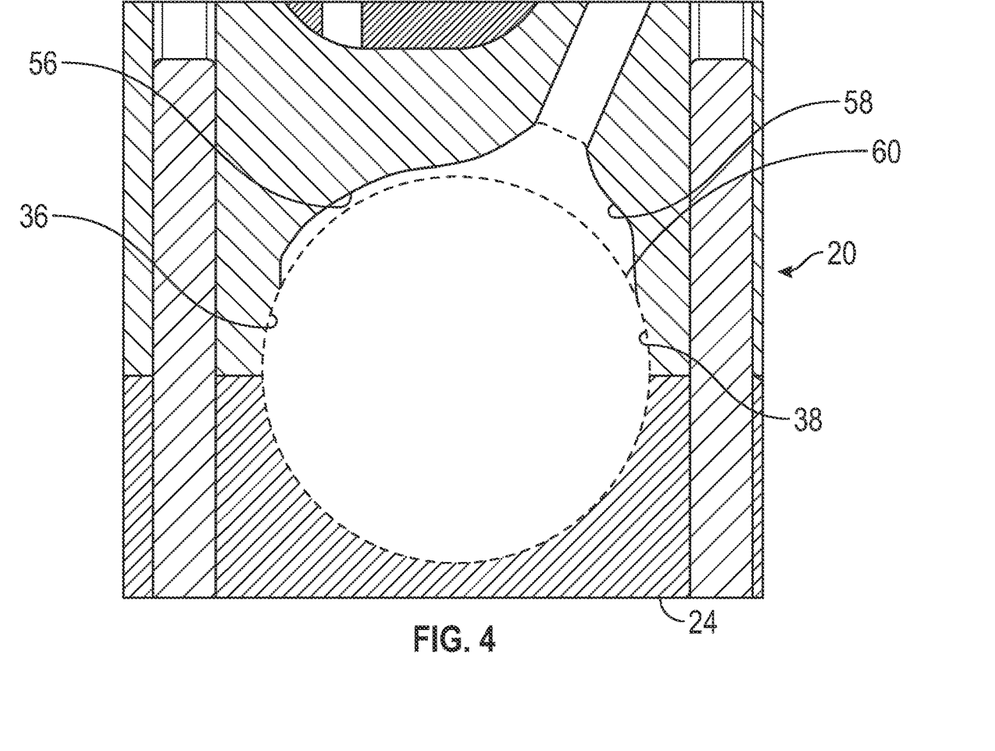
FIG. 4 is a sectional view of the combustion engine block and crankshaft case of FIG. 2 with the crankshaft bearing removed.

FIG. 4 is a sectional view of the combustion engine block and crankshaft case of FIG. 2 with the crankshaft bearing removed. An imaginary circle 61 is shown engaging or aligning with the first arc shaped surface 36 and the second arc shaped surface 38. In a number of variations, a first distance D1 between the outer surface 34 of the crankshaft cylindrical bearing 30 and the first concave shaped surface 56 of the combustion engine block 22 may not be the same or substantially the same as a second distance D2 between the outer surface 34 of the crankshaft cylindrical bearing 30 and the second concave shaped surface 58 of the combustion engine block 22.

Figure 5:
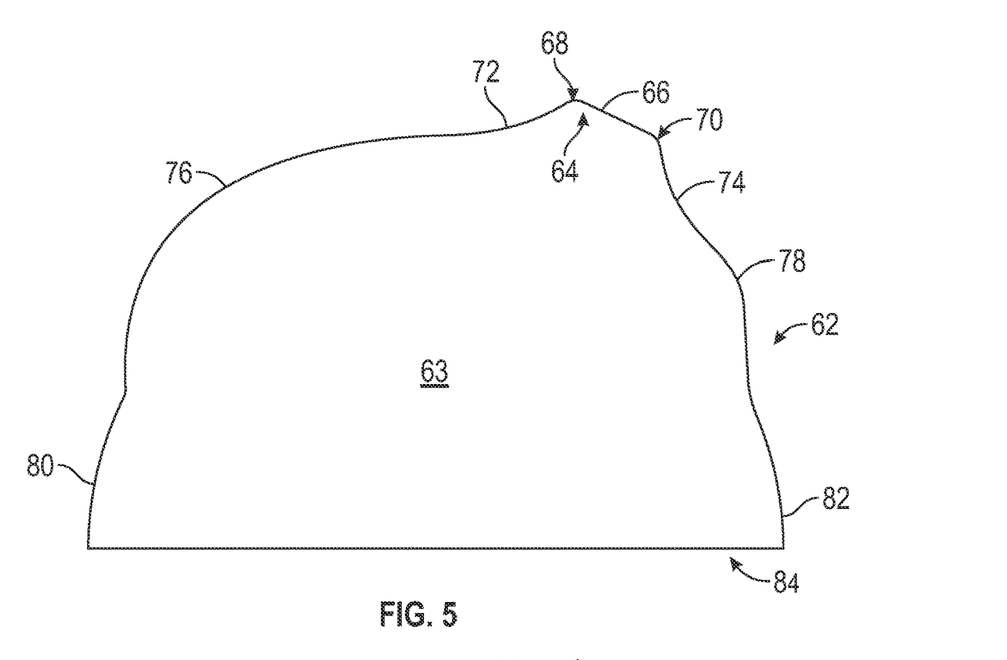
FIG. 5 is a sectional view of a casting core according to a number of variations.

FIG. 5 illustrates a number of variations, which may include a casting core 63, which may include any of a variety of materials, for example, but not limited to, a metal, sand, or a polymeric material. In a number of variations, the casting core 63 may include stainless steel. In a number of variations, the casting core 63 may include an inverse mouth portion 64 having a flat surface 66 joining a first curved surface 72 to form a first corner 68, and wherein the flat surface 66 may join a second curved surface 74 to form a second corner 70. The casting core 63 may include a first convex surface 76 joining the first convex shaped surface 72. The metal castings core 63 may include a second convex surface 78 joining the second convex surface 74. The casting core 63 may include a first arc shaped surface 80 and a second arc shaped surface 82. In a number of variations, an imaginary circle may have portions intersecting the first arc shaped surface 80 and the second arc shaped surface 82. In a number of variations, the first arc shaped 80 and the second arc shaped surface 82 may be configured to produce concave or arc shaped surfaces in the combustion engine block 22 for engaging the outer surface 34 of the crankshaft cylindrical bearing 30 shown in FIG. 1.

Figure 6:
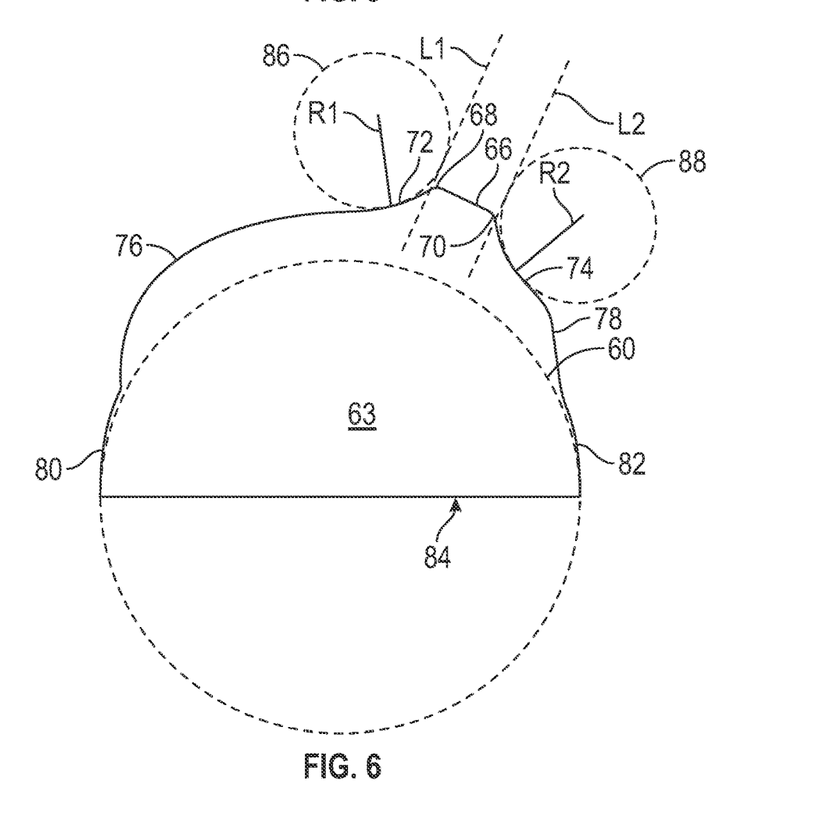
FIG. 6 is a sectional view of a casting core according to a number of variations.

A number of variations are illustrated in FIG. 6, wherein the first concave surface 72 of the casting core 63 may curve away from an imaginary line L1 running perpendicular to the flat surface 66 and through corner 68. In a number of variations, the second concave surface 72 of the casting core 63 may curve away from an imaginary line L2 running perpendicular to the flat surface 66 and through corner 70. In a number of variations, the first concave surface 72 and the second concave surface 74 may be symmetrical. In a number of variations, the first concave surface 72 of the casting core 63 may be radiused such that an imaginary circle 86 includes a portion engaging the first concave surface 72. Imaginary circle 86 may have a radius R1. In a number of variations, the second concave surface 74 of the casting core 63 may be radiused such that an imaginary circle 88 includes a portion engaging the second concave surface 72. Imaginary circle 86 may have a radius R2. In a number of variations, R1 and R2 may be the same length. In a number of variations, the first concave surface 72 and the second concave surface 74 may be radiused the same. In a number of variations, an imaginary circle 61 may have portions intersecting the first arc shaped surface 80 and the second arc shaped surface 82. In a number of variations, the first arc shaped surface 80 and the second arc shaped surface 82 may be configured to produce arch shaped surfaces in the combustion engine block 22 for engaging the outer surface 34 of the crankshaft cylindrical bearing 30 shown in FIG. 1.

Figure 7:
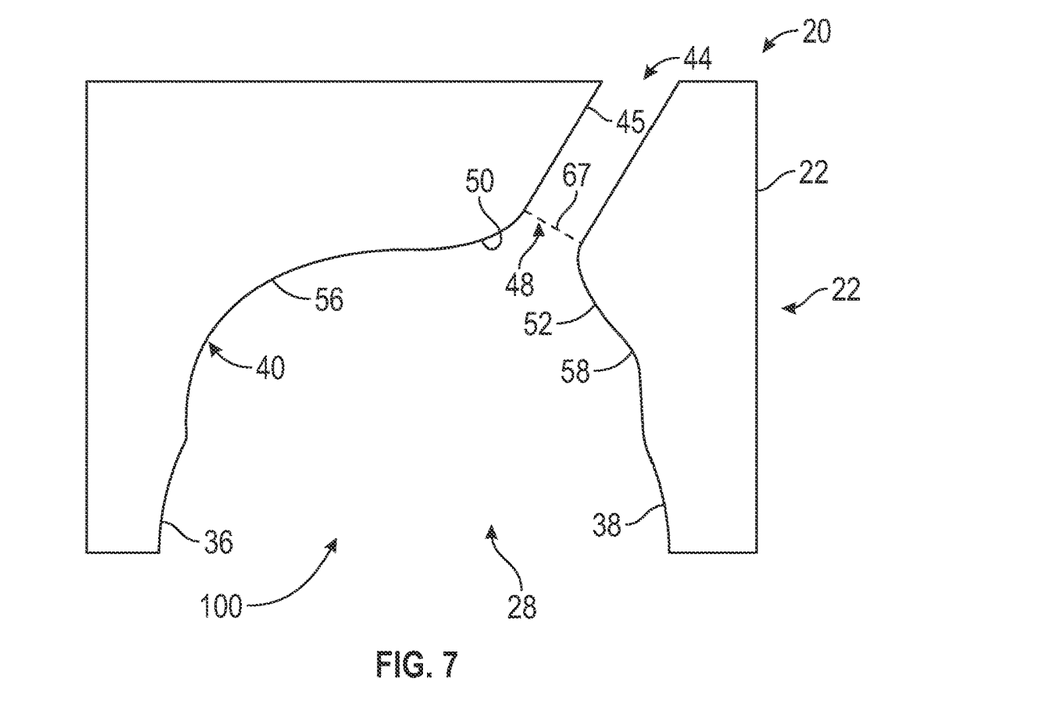
FIG. 7 is a sectional view of a combustion engine block having a cavity formed by the casting core of FIG. 6., and a main bearing feed groove communicating with a cavity formed by the casting core according to a number of variations.

Referring to FIG. 7, in a number of variations, a casting core, for example, as illustrated in FIG. 6, may be used in a metal casting process wherein molten metal is poured into a casting mold having the casting core 63. In a number of variations, the casting core 63 may be chilled. The molten metal may be allowed to cool to provide a solidified metal forming at least a portion of a combustion engine block 22, and thereafter, the casting core 63 removed to leave a cavity 28 in the combustion engine block. A main bearing feed groove 44 may be drilled through the combustion engine block 22 to remove a flat surface 67 left by the flat surface 66 of the casting core 63 to produce a structure the same or similar to that shown in FIG. 3. The main bearing feed groove 44 may be defined by surface 45 of the combustion engine block 22.

Figure 8:
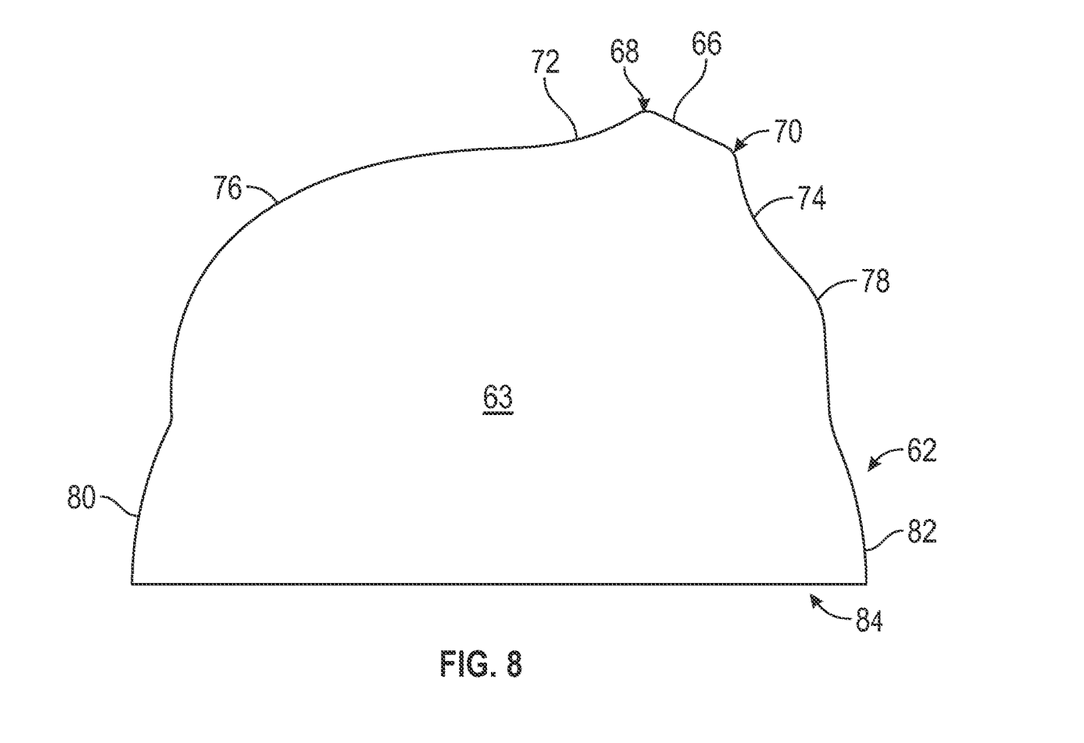
FIG. 8 is a sectional view of a casting core according to a number of variations.

FIG. 8 illustrates a number of variations, which may include a casting core 63 which may include an inverse mouth portion 64 having a flat surface 66 joining a first curved surface 72 to form a first corner 68, and wherein the flat surface 66 may join a second curved surface 74 to form a second corner 70. The casting core 63 may include a first convex surface 76 joining the first convex shaped surface 72. The casting core 63 may include a second convex surface 78 joining the second convex surface 74. In a number of variations, the first concaved surface and the second concaved surface of the casting core 63 are asymmetrical. The casting core 63 may include a first arc shaped surface 80 and a second arc shaped surface 82. In a number of variations, an imaginary circle may have portions intersecting the first arc shaped surface 80 and the second arc shaped surface 82. In a number of variations, the first arc shaped surface 80 and the second arc shaped surface 82 may be configured to produce arc shaped surfaces for engaging the outer surface 34 of the crankshaft cylindrical bearing 30 shown in FIG. 2.

Figure 9:
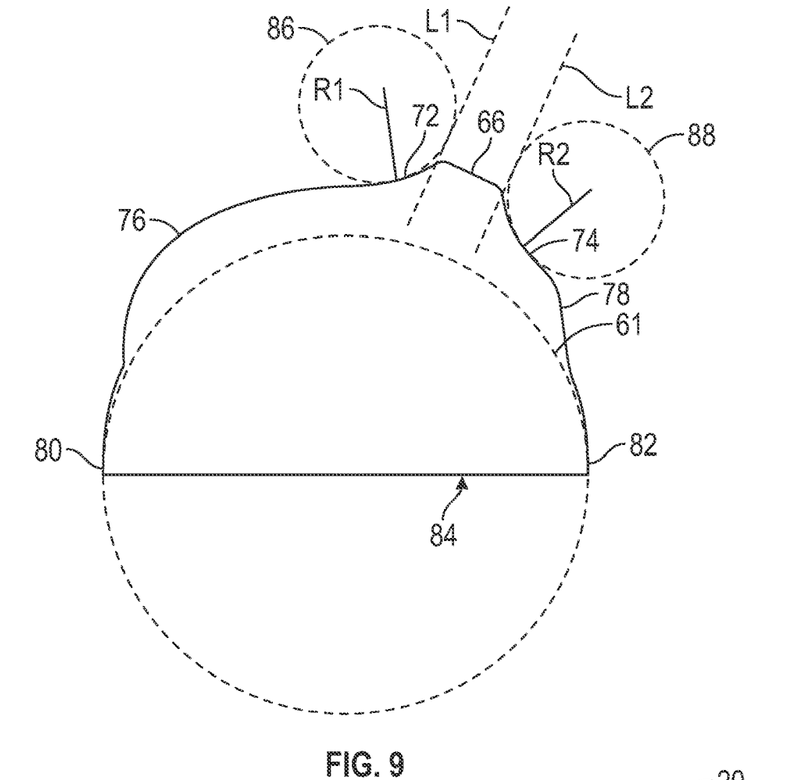
FIG. 9 is a sectional view of a casting core according to a number of variations.

A number of variations are illustrated in FIG. 9, wherein the first concave surface 72 of the casting core 63 may curve away from an imaginary line L1 running perpendicular to the flat surface 66 and through corner 68. In a number of variations, the second concave surface 72 of the casting core 63 may curve away from an imaginary line L2 running perpendicular to the flat surface 66 and through corner 70. In a number of variations, the first concave surface 72 and the second concave surface 74 may not be symmetrical. In a number of variations, the first concave surface 72 of the casting core 63 may be radiused such that an imaginary circle 86 includes a portion engaging the first concave surface 72. Imaginary circle 86 may have a radius R1. In a number of variations, the second concave surface 74 of the casting core 63 may be radiused such that an imaginary circle 88 includes a portion engaging the second concave surface 74. Imaginary circle 86 may have a radius R2. In a number of variations, R1 and R2 may have different lengths. In a number of variations, the first concave surface 72 and the second concave surface 74 may be radiused differently. Because the curve or radius of the second concave shaped surface 74 is formed on the acute angle between the cavity (main bearing feed groove) formed by drill and the rest of the oil charge grooves 40, 42, then the curve or radius of the second concave shaped surface 74 should have a minimum radius (or larger) to avoid core lock in the draw direction of the casting core 63. The curve or radius of the second concave shaped surface 74 should have a radius large enough to avoid core lock. As the acute angle decreases, this radius should increase to avoid a core lock condition. In a number of variations, an imaginary circle 61 may have portions intersecting the first arc shaped surface 80 and the second arc shaped surface 82. In a number of variations, the first arc shaped surface 80 and the second arc shaped surface 82 may be configured to produce arch shaped surfaces for engaging the outer surface 34 of the crankshaft cylindrical bearing 30 shown FIG. 2.

Figure 10:
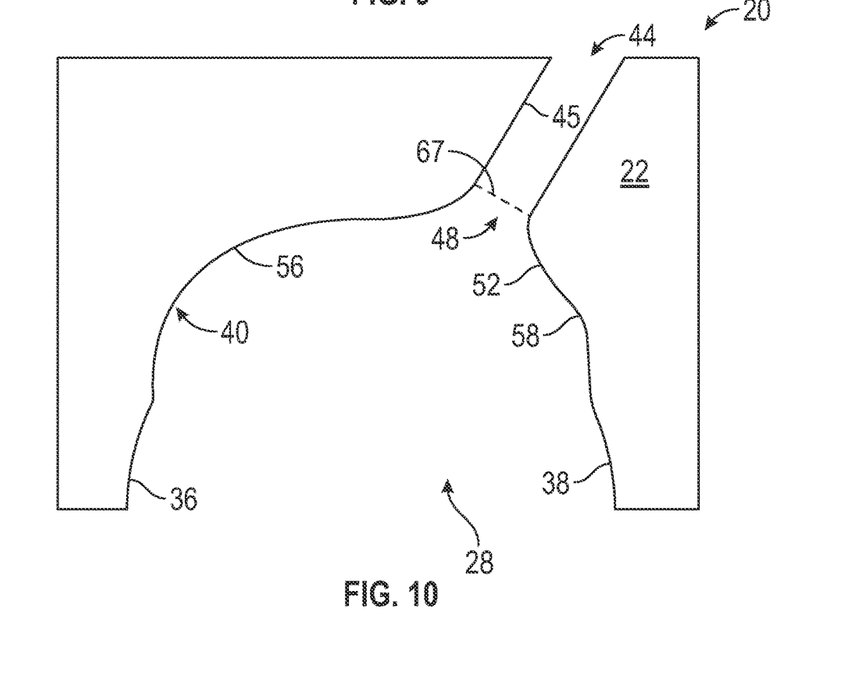
FIG. 10 is a sectional view of a combustion engine block having a cavity formed by the casting core of FIG. 9., and a main bearing feed groove communicating with the cavity formed by the casting core according to a number of variations.

Referring to FIG. 10, in a number of variations, a casting core, for example, as illustrated in FIG. 9, may be used in a metal casting process wherein molten metal is poured into a casting mold having the casting core 63. In a number of variations, the casting core 63 may be chilled. The molten metal may be allowed to cool to form a solidified metal forming at least a portion of a combustion engine block 22, and thereafter, the casting core 63 removed to leave a cavity 28. A main bearing feed groove 44 may be formed by drilling through the combustion engine block 22 to remove a flat surface 67 left by the flat surface 66 of the casting core 63 to produce a structure the same or similar to that shown in FIG. 4. The main bearing feed groove 44 may be defined by surface 45 of the combustion engine block 22.

Figure 11:
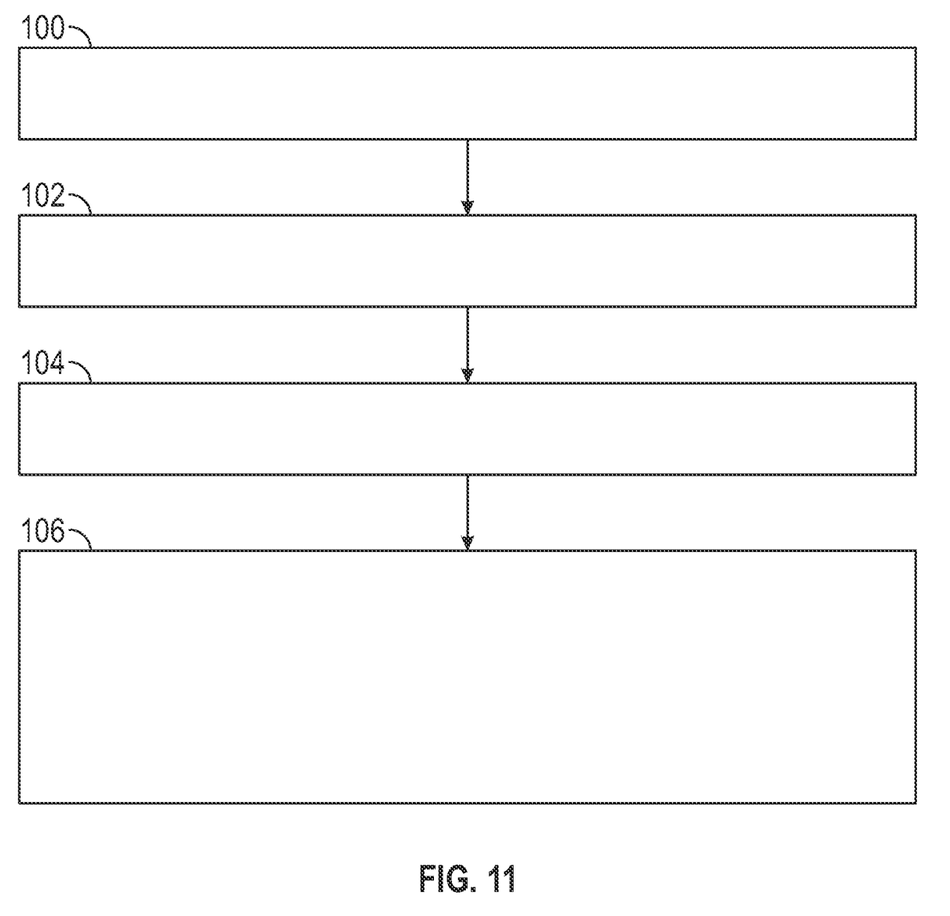
FIG. 11 is a flow chart illustrating a method of making a combustion engine block according to a number of variations.

FIG. 11 is a flow chart illustrating a method of making a combustion engine block according to a number of variations. In a number of variations, the method may include placing a casting core in a casting mold and pouring molten metal into the casting mold 100. Pouring molten metal into the metal casting mold and allowing the molten metal to solidify metal to form at least a portion of a combustion engine block, wherein the solidified metal includes a flat surface adjacent to the flat surface of the casting core 102. Removing the casting core to leave a cavity in the solidified metal configured for receiving a crankshaft cylindrical bearing and a crankshaft received in the crankshaft cylindrical bearing 104. Forming a main bearing feed groove in the solidified metal communicating with the cavity in the solidified metal and removing the flat surface of the solidified metal, wherein the main bearing feed groove is defined by main bearing feed groove surface in the cavity in the solidified metal is defined in part by at least in oil feed groove surface, and wherein the main bearing feed groove surface and the at least one oil feed groove surface define an oil flow path free of sharp corners or edges 106.

Figure 12:
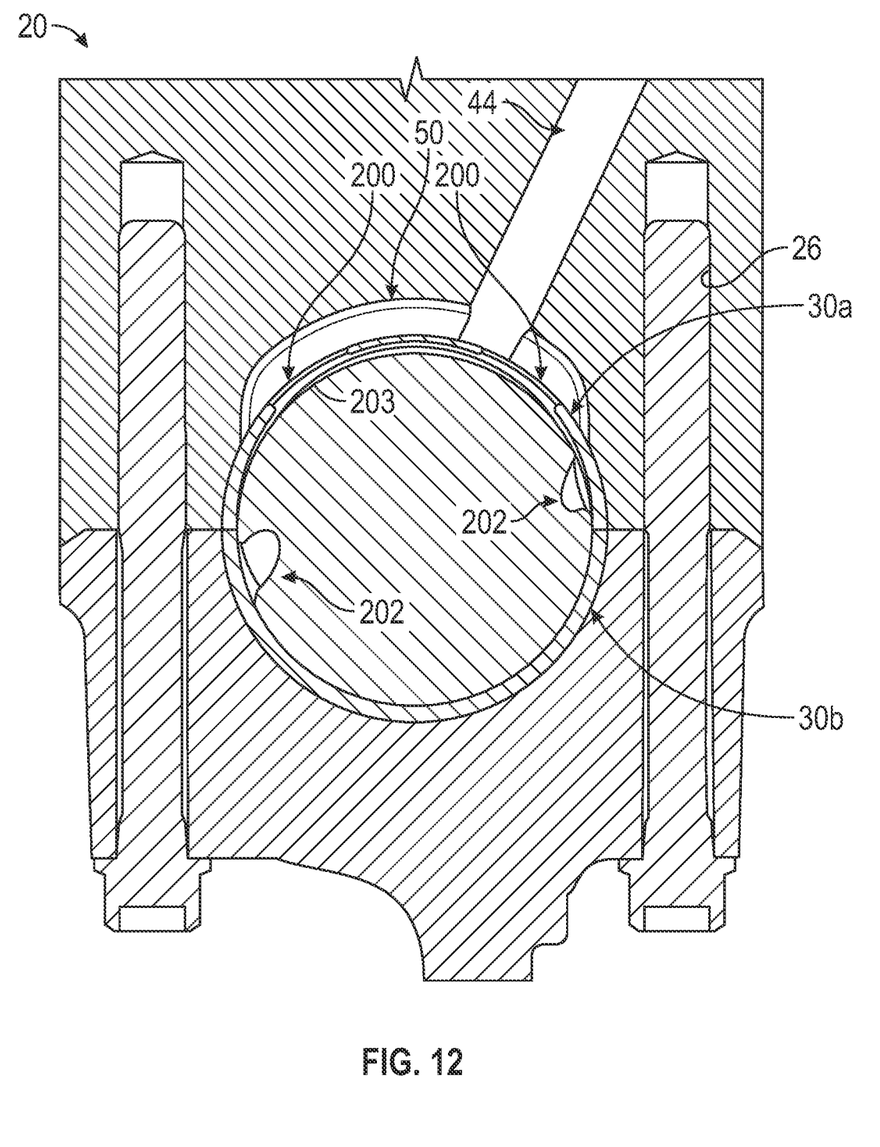
FIG. 12 is a sectional view of a combustion engine block taken through a bearing according to a number of variations.

FIG. 12 is a sectional view of a combustion engine block taken through a bearing according to a number of variations. FIG. 12 illustrates a number of variations which may include a product 20 similar to the product 20 shown in FIG. 1 but wherein the bearing includes a first portion 30a and a second portion 30b couple together. At least one of the bearing first portion 30a or the second portion 30b has one or more slots 200 formed therein for oil to flow though and fill a bearing groove 203 formed in the bearing. The crankshaft 201 may include one or more rod bearing feed holes 202 that may periodically register or align with the one or more of the slots 200 and the bearing groove 203 so that oil can flow through the one or more rod bearing feed holes 202 as the crankshaft 201 rotates.

Figure 13:
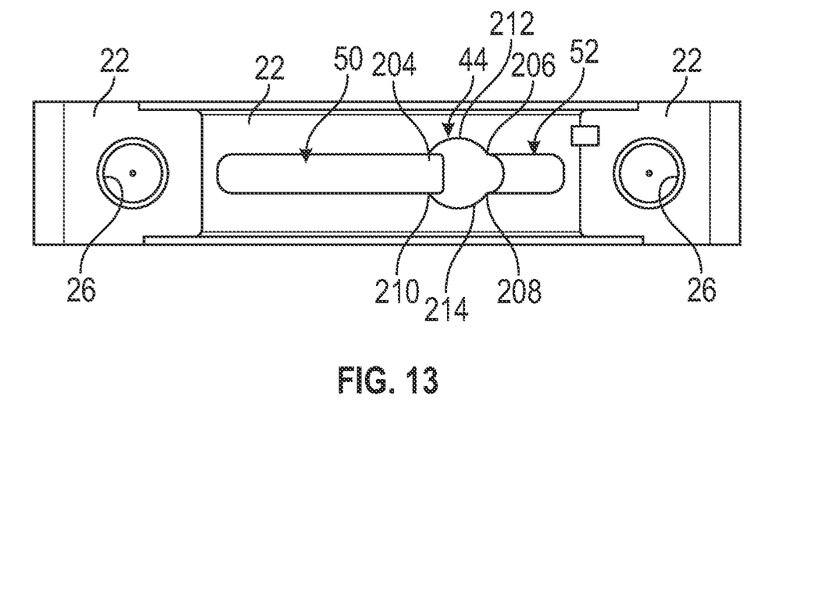
FIG. 13 is a partial sectional view showing a main bearing feed groove intersecting at an angle with an oil feed groove according to a number of variations.

FIG. 13 is a partial sectional view showing a main bearing feed groove intersecting at an angle with an oil feed groove according to a number of variations. The casting or combustion engine block 22 has a first convex shaped surface 50 and a second convex shaped surface 52 that intersect the main bearing feed groove 44. The intersection may produce sharp corners 204, 206, 208 and 210. However, the casting core 63, shown in FIGS. 5-6, 8-9, and 16, may have curved surfaces which eliminate the sharp corners 204, 206, 208, 210 shown in FIG. 13. Furthermore, the casting core 63 may be configured to produce curved surfaces 212, 214 along other points of intersection of the surface defining the main bearing feed groove 44 and the first convex shaped surface 50 and second convex shaped surface 52 formed in the casting or combustion engine block 22.

Figure 14:
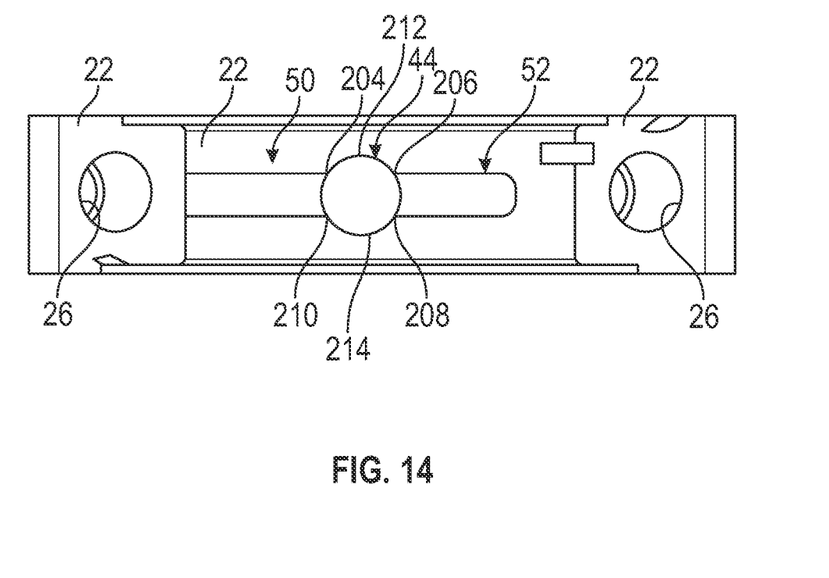
FIG. 14 is a partial sectional view taken perpendicular to an axis of a main bearing feed groove and showing the intersection of the main bearing feed groove with an oil feed groove according to a number of variations.

FIG. 14 is a partial sectional view taken perpendicular to an axis of a main bearing feed groove and showing the intersection of the main bearing feed groove with an oil feed groove according to a number of variations. Like shown in FIG. 13, the casting or combustion engine block 22 has a first convex shaped surface 50 and a second convex shaped surface 52 that intersect the surface defining the main bearing feed groove 44. The intersection may produce sharp corners 204, 206, 208 and 210. However, the casting core 63, shown in FIGS. 5-6, 8-9, and 16, may have curved surfaces which eliminate the sharp corners 204, 206, 208, 210 shown in FIG. 14. Furthermore, the casting core 63 may be configured to produce curved surfaces at 212, 214 along other points of intersection of the surface defining main bearing feed groove 44 and the first convex shaped surface 50 and second convex shaped surface 52 formed in the casting or combustion engine block 22.

Figure 15:
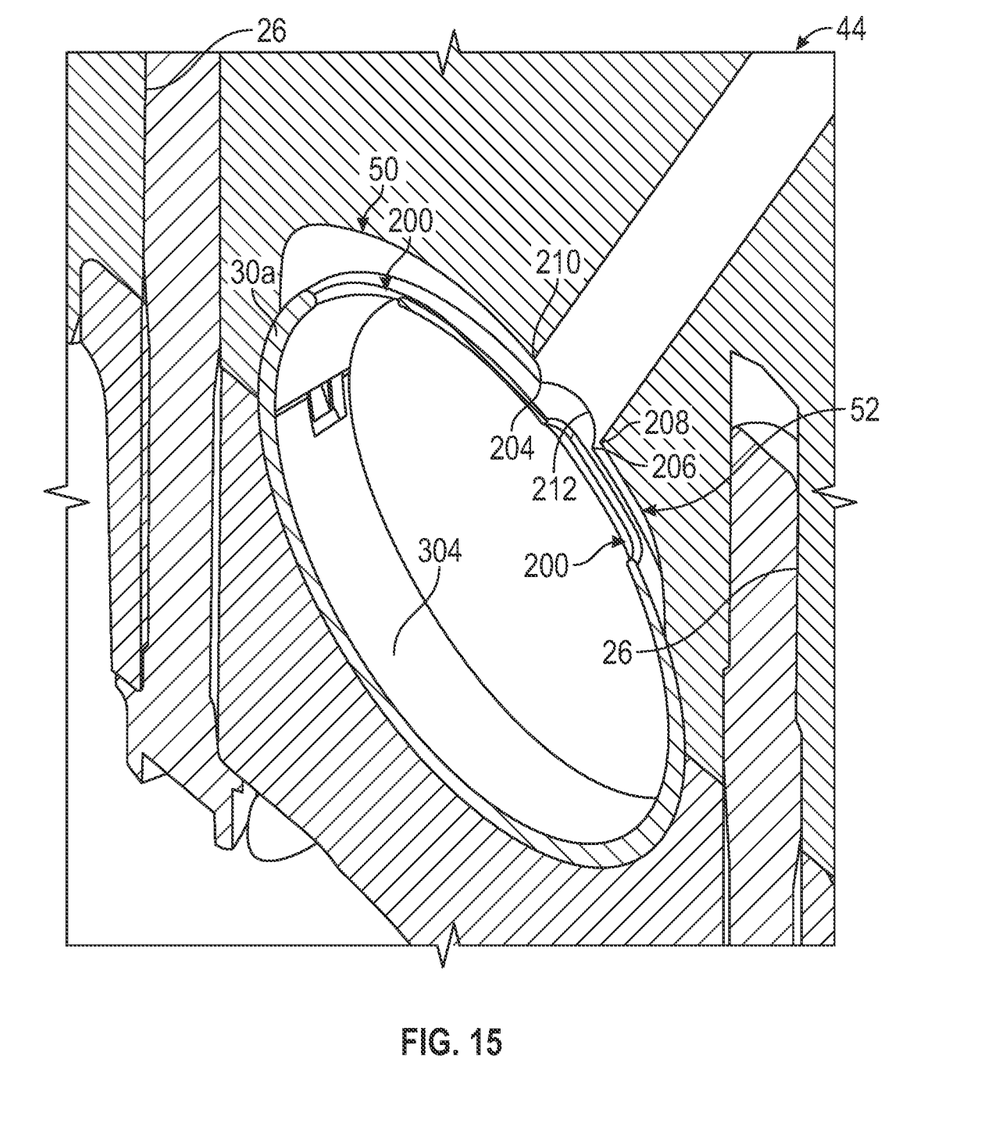
FIG. 15 a perspective view of a sectional view of a combustion engine block taken through a bearing according to a number of variations.

FIG. 15 a perspective view of a sectional view of a combustion engine block taken through a bearing according to a number of variations. The casting core 63, shown in FIGS. 5-6, 8-9, and 16, may have curved surfaces which eliminate the sharp corners 208, 210 shown in FIG. 15. Furthermore, the casting core 63 may be configured to produce curved surfaces at 212 along other points of intersection of the surface defining the main bearing feed groove 44 and the first convex shaped surface 50 and second convex shaped surface 52 formed in the casting or combustion engine block 22.

Figure 16:
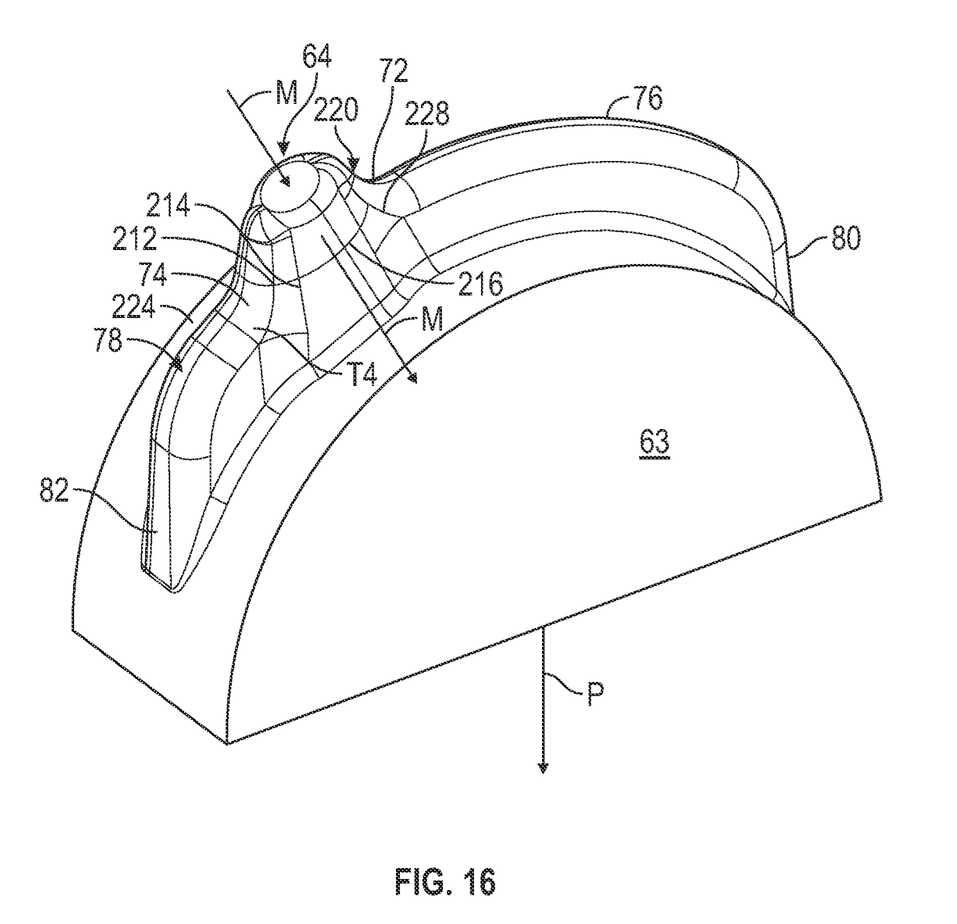
FIG. 16 is a perspective view of a casting core according to a number of variations.

FIG. 16 is a perspective view of a casting core according to a number of variations, the casting core 63 may include, as previously described an inverse mouth portion 64 which intersects the first convex surface 76 and the second convex surface 78, which form the first oil charge portion or groove 40 and the second oil charge portion or groove 42 (shown in FIG. 1) in the casting 22, respectively. Curved surfaces, for example, 202, 222, 224, 226, 228 are provide along the periphery of the inverse mouth portion 64 where it intersects the first convex surface 76 and the second convex surface 78 so that there are no sharp corners or surfaces in the casting or combustion engine 22 produced using the casting core 63 and after drilling the main bearing feed tube 44 (shown in FIG. 1). Line P indicates the direction of pull to remove the casting core 63 from a casting mold, and line M indicates the direction of the axis of the main bearing feed groove.

The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

Variation 1 may include a product comprising: a casting having a surface defining a main bearing feed groove and a surface defining at least one oil feed groove, the surface defining the main bearing feed groove and surface defining the at least one oil feed groove intersecting without any sharp corners or edges so that a smooth flow path is defined through the main bearing feed groove and into the at least one oil feed groove.

Variation 2 may include a product as set forth in Variation 1 wherein the at least one oil feed groove comprises a first oil feed groove and a second oil feed groove intersecting the main bearing feed groove without any sharp corners or edges.

Variation 3 may include a product as set forth in Variation 2 wherein the casting includes a first curved surface intersecting the surface defining the main bearing feed groove, and a second curved surface intersecting the surface defining the main bearing feed groove.

Variation 4 may include a product as set forth in Variation 2 wherein the casting includes a first radiused surface intersecting a surface defining the main bearing feed groove, and a second radius surface intersecting the surface defining the main bearing feed groove.

Variation 5 may include a product as set forth in Variation 3 wherein the first curved surface and the second curved surface are asymmetrical.

Variation 6 may include a product as set forth in Variation 4 wherein the first radiused surface has a different radius than the second radiused surface.

Variation 7 may include a product as set forth in Variation 3 wherein the first curved surface and the second curved surface are symmetrical.

Variation 8 may include a product as set forth in Variation 2 wherein the casting includes a first arc shaped surface and a second arc shaped surface in part defining a cavity in the casting, further comprising a bearing having a cylindrical outer surface engaging the first arc shaped surface and the second arc shaped surface of the casting.

Variation 9 may include a product as set forth in Variation 8 wherein the cavity includes the first oil feed groove and the second oil feed groove and a mouth portion communicating with the first oil feed groove and the second oil feed groove and the main bearing feed groove, wherein the first oil feed groove is defined at least in part by a first concave surface in the casting, and the second oil feed groove is defined at least in part by a second concave surface in the casting, wherein the first oil feed groove is spaced a distance D1 from the first concave surface to the cylindrical outer surface of the bearing, wherein the second oil feed groove is spaced a distance D2 from the second concave surface of the earing.

Variation 10 may include a product as set forth in Variation 9 wherein the distance D1 and the distance D2 are substantially the same.

Variation 11 may include a product as set forth in Variation 9 wherein the distance D1 in the distance D2 are not the same.

Variation 12 may include a method comprising: placing a casting core in a casting mold and pouring molten metal into the casting mold; allowing the molten metal to cool to form a solidified metal and form at least a portion of a casting; removing the casting core to leave a cavity in the solidified metal configured to receive a bearing; forming a main bearing feed groove in the solidified metal communicating with the cavity in the solidified metal, wherein the main bearing feed groove is defined by a main bearing feed groove surface and the cavity in the solidified metal is defined in part by at least an oil feed groove surface, and wherein the main bearing feed groove surface and the at least one oil feed groove surface define an oil flow path free of sharp corners or edges.

Variation 13 may include a method as set forth in Variation 12 wherein the casting core comprises an inverse mouth portion including a flat surface having a first end and an opposite second end, a first curved surface connected to a first end of the flat surface so that the first curved surface and the first end of the flat surface form a first corner, and a second curved surface connected to the second end of the flat surface so that the second curved surface and the second end of the flat surface form a second corner, and wherein the first curved surface curves away from a first imaginary line extending perpendicular to the flat surface and intersecting the first corner, and wherein the second curved surface curves away from a second imaginary line extending perpendicular to the flat surface and intersecting the second corner.

Variation 14 may include a method as set forth in Variation 13 wherein forming a main bearing feed groove in the solidified metal comprises drilling through the casting to remove a flat surface in the solidified metal left by the flat surface of the casting core.

Variation 15 may include a method as set forth in Variation 12 wherein the at least one oil feed groove comprises a first oil feed groove and a second oil feed groove each intersecting the main bearing feed groove without any sharp corners or edges.

Variation 16 may include a method as set forth in any of Variations 12-15 wherein the casting includes a first curved surface intersecting the surface defining the main bearing feed groove, and a second curved surface intersecting the surface defining main bearing feed groove.

Variation 17 may include a method as set forth in Variation 12 wherein the first curved surface and the second curved surface are asymmetrical.

Variation 18 may include a method as set forth in Variation 12 wherein the casting includes a first radiused surface intersecting a surface defining the main bearing feed groove, and a second radius surface intersecting the surface defining the main bearing feed groove.

Variation 19 may include a product comprising: a casting core having an inverse mouth portion including a flat surface having a first end and an opposite second end, a first curved surface connected to a first end of the flat surface so that the first curved surface and the first end of the flat surface form a first corner, and a second curved surface connected to the second end of the flat surface so that the second curved surface and the second end of the flat surface form a second corner, and wherein the first curved surface curves away from a first imaginary line extending perpendicular to the flat surface and intersecting the first corner, and wherein the second curved surface curves away from a second imaginary line extending perpendicular to the flat surface and intersecting the second corner.

Variation 20 product as set forth in Variation 19 wherein the casting core comprises stainless steel.

While at least one illustrative variation has been presented in the foregoing detailed description, it should be appreciated that a vast number of variations exist. It should also be appreciated that the variations are only examples, and are not intended to limit the scope, applicability, or configuration of the disclosure in any way. Rather, the foregoing detailed description will provide those skilled in the art with a convenient road map for implementing the variations. It should be understood that various changes can be made in the function and arrangement of elements without departing from the scope of the disclosure as set forth in the appended claims and the legal equivalents thereof.

What is claimed is:

1. A product comprising:
an engine block comprising a casting having a surface defining a main bearing feed groove and a surface defining at least one oil feed groove, a first convex surface interecting the surface defining the main bearing feed groove and the surface defining the at least one oil feed groove so that a smooth flow path is defined through the main bearing feed groove and into the at least one oil feed groove; wherein the surface defining the at least one oil feed groove comprises a first surface defining a first oil feed groove and a second surface defining a second oil feed groove; and wherein the casting includes a second convex surface intersecting the surface defining the second oil feed groove and the surface defining the main bearing feed groove.

2. The product as set forth in claim 1 wherein the casting includes a first arc shaped surface and a second arc shaped surface in part defining a cavity in the casting.

3. The product as set forth in claim 1 wherein the first convex surface has a first radius and the second convex surface has a second radius different than the first convex surface.

4. The product is set forth in claim 1 wherein the casting includes a first concave surface defining the first oil feed groove and a second concave surface defining the second oil feed groove.

5. The product as set forth in claim 1 wherein the first surface defining the first oil feed groove and the second surface defining the second oil feed groove are asymmetrical.

6. The product is set forth in claim 4 wherein the first convex surface has a first radius and the second convex surface has a second radius different than the first convex surface.

7. The product is set forth in claim 1 wherein the first surface defining the first oil feed groove and the second surface defining the second oil feed groove are symmetrical.

8. The product as set forth in claim 1 wherein the casting includes a second convex surface intersecting the second surface defining the second oil feed groove and the surface defining the main bearing feed groove;
wherein the casting includes a first concave surface defining the first oil feed groove and a second concave surface defining the second oil feed groove;
wherein the first surface defining the first oil feed groove and the second surface defining the second oil feed groove are asymmetrical;
wherein the casting includes a first arc shaped surface and a second arc shaped surface in part defining a cavity in the casting, further comprising a bearing having a cylindrical outer surface engaging the first arc shaped surface and the second arc shaped surface of the casting.

9. A product comprising a casting having a surface defining a main bearing feed groove and a surface defining at least one oil feed groove, the surface defining the main bearing feed groove and the surface defining the at least one oil feed groove intersecting so that a smooth flow path is defined through the main bearing feed groove and into the at least one oil feed groove;
wherein the at least one oil feed groove comprises a first oil feed groove and a second oil feed groove intersecting the main bearing feed groove;
wherein the casting includes a first arc shaped surface and a second arc shaped surface in part defining a cavity in the casting, further comprising a bearing having a cylindrical outer surface engaging the first arc shaped surface and the second arc shaped surface of the casting;

wherein the cavity includes the first oil feed groove and the second oil feed groove and a mouth portion communicating with the first oil feed groove and the second oil feed groove and the main bearing feed groove, wherein the first oil feed groove is defined at least in part by a first concave surface in the casting, and the second oil feed groove is defined at least in part by a second concave surface in the casting, wherein the first oil feed groove is spaced a distance D1 from the first concave surface to the cylindrical outer surface of the bearing, wherein the second oil feed groove is spaced a distance D2 from the second concave surface of a cylindrical bearing; a first convex surface intersecting the surface defining the main bearing feed groove and the surface defining the at least one oil feed groove so that the smooth flow path is defined through the main bearing feed groove and into the at least one oil feed groove; and wherein the casting includes a second convex surface intersecting the surface defining the second oil feed groove and the surface defining the main bearing feed groove.

10. The product is set forth in claim 9 wherein the distance D1 and the distance D2 are substantially equal.

11. The product is set forth in claim 9 wherein the distance D1 in the distance D2 are not equal.

12. A method comprising:
placing a casting core in a casting mold and pouring molten metal into the casting mold;
allowing the molten metal to cool to form a solidified metal and to form at least a portion of a casting;
removing the casting core to leave a cavity in the solidified metal configured to receive a bearing;
forming a main bearing feed groove in the solidified metal communicating with the cavity in the solidified metal, wherein the main bearing feed groove is defined by a main bearing feed groove surface and the cavity in the solidified metal is defined in part by at least a first convex surface intersecting an oil feed groove surface and the main bearing feed groove surface; the method producing a product comprising:
an engine block comprising the casting having the surface defining the main bearing feed groove and the surface defining at least one oil feed groove, the first convex surface intersecting the surface defining the main bearing feed groove and surface defining the at least one oil feed groove so that a smooth flow path is defined through the main bearing feed groove and into the at least one oil feed groove; wherein the surface defining the at least one oil feed groove comprises a first surface defining a first oil feed groove and a second surface defining a second oil feed groove; and wherein the casting includes a second convex surface intersecting the second surface defining the second oil feed groove and the surface defining the main bearing feed groove.

13. A method as set forth in claim 12 wherein the casting core comprises an inverse mouth portion including a flat surface having a first end and an opposite second end, a first curved surface connected to the first end of the flat surface so that the first curved surface and the first end of the flat surface form a first corner, and a second curved surface connected to the second end of the flat surface so that the second curved surface and a second end of the flat surface form a second corner, and wherein the first curved surface curves away from a first imaginary line extending perpendicular to the flat surface and intersecting the first corner, and wherein the second curved surface curves away from a second imaginary line extending perpendicular to the flat surface and intersecting the second corner.

14. A method as set forth in claim 13 wherein forming the main bearing feed groove in the solidified metal comprises drilling through the casting to remove a flat surface in the solidified metal left by the flat surface of the casting core.

15. A method as set forth in claim 12 wherein the at least one oil feed groove comprises the first oil feed groove and the second oil feed groove each intersecting the main bearing feed groove.

16. A method as set forth in claim 12 wherein the casting includes a first curved surface intersecting the surface defining the main bearing feed groove, and a second curved surface intersecting the surface defining the main bearing feed groove.

17. A method as set forth in claim 14 wherein the first curved surface and the second curved surface are asymmetrical.

18. A method as set forth in claim 12 wherein the casting core comprises an inverse mouth portion including a flat surface having a first end and an opposite second end, a first curved surface connected to the first end of the flat surface so that the first curved surface and the first end of the flat surface form a first corner, and a second curved surface connected to the second end of the flat surface so that the second curved surface and the second end of the flat surface form a second corner, and wherein the first curved surface curves away from a first imaginary line extending perpendicular to the flat surface and intersecting the first corner, and wherein the second curved surface curves away from a second imaginary line extending perpendicular to the flat surface and intersecting the second corner;
wherein forming the main bearing feed groove in the solidified metal comprises drilling through the casting to remove a flat surface in the solidified metal left by the flat surface of the casting core;
wherein the at least one oil feed groove comprises the first oil feed groove and a second oil feed groove each intersecting the main bearing feed groove;
wherein the casting includes a convex surface intersecting the surface defining the main bearing feed groove.

19. A product comprising:
an engine block comprising a casting having a surface defining a main bearing feed groove and a surface defining at least one oil feed groove, a first convex surface intersecting the surface defining the main bearing feed groove and the surface defining the at least one oil feed groove, wherein the surface defining the at least one oil feed groove comprises a surface defining a first oil feed groove and a surface defining a second oil feed groove; and wherein the casting includes a second convex surface intersecting the surface defining the second oil feed groove and the surface defining the main bearing feed groove;
a first concave surface defining the first oil feed groove and a second concave surface defining the second oil feed groove;
wherein the surface defining the first oil feed groove and the surface defining the second oil feed groove are asymmetrical;
wherein the first convex surface has a first radius and the second convex surface has a second radius different than the first convex surface;
wherein the casting includes a first arc shaped surface and a second arc shaped surface in part defining a cavity in the casting, further comprising a bearing having a cylindrical outer surface engaging the first arc shaped surface and the second arc shaped surface of the casting.

\* \* \* \* \*